United States Patent
Noel et al.

(10) Patent No.: US 10,919,348 B2
(45) Date of Patent: Feb. 16, 2021

(54) TIRE WITH RFID LOCATOR

(71) Applicant: The Goodyear Tire & Rubber Company, Akron, OH (US)

(72) Inventors: Jean-Pierre Noel, Attert (BE); Eric Michel Paul Muller, Contz-les-Bains (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/121,684

(22) Filed: Sep. 5, 2018

(65) Prior Publication Data

US 2020/0070597 A1    Mar. 5, 2020

(51) Int. Cl.
| | |
|---|---|
| G08B 23/00 | (2006.01) |
| B60C 23/04 | (2006.01) |
| B29D 30/00 | (2006.01) |
| B60C 13/00 | (2006.01) |
| B60C 19/00 | (2006.01) |

(52) U.S. Cl.
CPC ...... *B60C 23/0493* (2013.01); *B29D 30/0061* (2013.01); *B60C 13/00* (2013.01); *B60C 19/00* (2013.01); *B29D 2030/0077* (2013.01)

(58) Field of Classification Search
None
See application file for complete search history.

(56) References Cited

U.S. PATENT DOCUMENTS

| | | | |
|---|---|---|---|
| 4,625,101 A | 11/1986 | Hinks et al. | |
| 4,941,522 A | 7/1990 | Sakurai | |
| 5,645,661 A | 7/1997 | Clementz et al. | |
| 6,253,815 B1 | 7/2001 | Kemp et al. | |
| 6,832,638 B2 | 12/2004 | Oyama | |
| 7,153,381 B2 | 12/2006 | Majumdar et al. | |
| 7,204,284 B2 | 4/2007 | Paturle et al. | |
| 7,232,498 B2 | 6/2007 | Zimmer et al. | |
| 7,453,407 B2 | 11/2008 | Logan et al. | |
| 8,157,172 B2 | 4/2012 | Fenkanyn | |
| 8,430,142 B2 | 4/2013 | Incavo et al. | |
| 9,114,671 B2 | 8/2015 | Adamson et al. | |
| 9,454,707 B1 | 9/2016 | Tracy et al. | |
| 9,827,724 B2 | 11/2017 | Dorfi et al. | |
| 10,105,997 B2 | 10/2018 | Fenkanyn et al. | |
| 10,137,741 B2 | 11/2018 | Ferry et al. | |
| 2002/0092346 A1* | 7/2002 | Niekerk | B60C 23/0416 73/146.2 |
| 2004/0134578 A1 | 7/2004 | Kleckner | |

(Continued)

FOREIGN PATENT DOCUMENTS

EP    2186658 A1    7/2012

*Primary Examiner* — Julie B Lieu
(74) *Attorney, Agent, or Firm* — Edward T. Kennedy

(57) ABSTRACT

A tire includes an RFID locator. The tire includes a pair of bead areas and a ground-contacting tread disposed radially outwardly of the pair of bead areas. Each sidewall of a pair of sidewalls extends from a respective bead area to the tread. A carcass extends toroidally between each of the bead areas radially inwardly of the tread and an innerliner is formed on an inside surface of the carcass. An RFID tag is attached to the tire at an area of a selected one of the sidewalls through interior sidewall attachment. A locator indicia is integrated into an axial outer surface of the selected sidewall at a locator area.

17 Claims, 3 Drawing Sheets

(56) References Cited

U.S. PATENT DOCUMENTS

| | | | |
|---|---|---|---|
| 2006/0238356 A1* | 10/2006 | Tucker | G06K 19/04 340/572.8 |
| 2007/0013502 A1* | 1/2007 | Park | B60C 23/0483 340/447 |
| 2008/0246588 A1 | 10/2008 | Shimura | |
| 2010/0122757 A1* | 5/2010 | Lionetti | B60C 23/041 152/152.1 |
| 2012/0291936 A1 | 11/2012 | Lionetti et al. | |
| 2013/0126063 A1 | 5/2013 | Landers et al. | |
| 2015/0186691 A1* | 7/2015 | Loop | G06Q 10/0833 340/10.51 |
| 2015/0246587 A1 | 9/2015 | Muhlhoff et al. | |
| 2016/0009141 A1* | 1/2016 | Suga | B60C 11/0083 152/209.9 |
| 2016/0075189 A1* | 3/2016 | Engel | B60C 11/246 340/438 |
| 2016/0084739 A1* | 3/2016 | Park | G01M 17/027 73/146 |
| 2016/0107490 A1 | 4/2016 | Randall et al. | |
| 2016/0311274 A1* | 10/2016 | Tanno | B60C 23/0493 |
| 2017/0050473 A1 | 2/2017 | Muhlhoff et al. | |
| 2017/0368889 A1* | 12/2017 | Ajoviita | B60C 11/1625 |
| 2019/0217562 A1* | 7/2019 | Uijlenbroek | B29D 30/0061 |
| 2019/0225025 A1* | 7/2019 | Suzuki | B60C 5/00 |
| 2019/0283505 A1* | 9/2019 | Kuriyama | B60C 11/0316 |

* cited by examiner

TIRE WITH RFID LOCATOR

FIELD OF THE INVENTION

The invention relates to tires. More particularly, the invention relates to tires with radio frequency identification devices. Specifically, the invention is directed to a tire that includes a radio frequency identification device and an integrated indicia to readily communicate the location of the device within the tire.

BACKGROUND OF THE INVENTION

Pneumatic tires have been widely employed. Such tires include a pair of beads that are mounted on a wheel or rim. Each one of pair of sidewalls extends from a respective bead to a ground-engaging tread. A carcass, which is made of one or more plys, toroidally extends between the beads to reinforce the sidewalls and the tread. An innerliner is formed on the inside surface of the carcass. The wheel cooperates with the innerliner to define an interior cavity that is inflated with air.

It has been desirable to provide such pneumatic tires with an electronic device that enables information about the tire to be transmitted to an external device for tracking and identification of the tire during its lifetime. One such electronic device is a radio frequency identification (RFID) device, sometimes referred to as an RFID tag.

Most RFID tags contain at least two parts. One part is an integrated circuit for storing and processing information, which includes information that identifies the tire. The second part is an antenna for receiving and transmitting a signal to an external reader. The antenna is electronically connected to the integrated circuit and may be carried on a substrate with the integrated circuit, or partially affixed to the substrate to secure the connection with the integrated circuit.

In the prior art, RFID tags were attached to the exterior of a sidewall of a pneumatic tire. The exterior of a tire sidewall provides a convenient location that enables strong transmission of the signal from the RFID tag to an RFID reader. However, the RFID tag may incur potential damage when it is attached to the exterior of a tire sidewall. To reduce such potential damage, it has become more common to attach the RFID tag to the innerliner of the tire at the sidewall by using an adhesive or by curing the innerliner with the RFID tag in place at the sidewall, or by placing the RFID tag between layers of the tire structure at the sidewall. Such attachment shall be referred to herein as interior sidewall attachment.

When interior sidewall attachment of the RFID tag is employed, the tag may not be readily visible after the tire is formed. In addition, interior sidewall attachment of the RFID tag reduces the strength of the RFID transmission signal, requiring a reader to be within a short distance of the tag to properly read the RFID signal. As a result, when a technician uses a hand-held reader, the technician may not be able to visually determine the location of the RFID tag in the tire for optimum placement of the reader near the tag. In such a case, if the RFID tag is disposed in the opposing tire sidewall from the location of the reader, the RFID signal may not be strong enough to be read by the reader.

When the RFID signal cannot be read by the reader, the tire may not be properly identified and/or tracked, which is undesirable. To ensure proper reading of the RFID signal, the technician must expend extra time and effort moving the reader around each side of the tire, or adjusting the position of the tire, until the reader is in close enough proximity to pick up the signal from the RFID tag.

As a result, it is desirable to develop a tire with a structure that enables clear and easy communication to a technician of the location of an RFID tag with interior sidewall attachment.

SUMMARY OF THE INVENTION

According to an aspect of an exemplary embodiment of the invention, a tire including an RFID locator is provided. The tire includes a pair of bead areas and a ground-contacting tread disposed radially outwardly of the pair of bead areas. Each one of a pair of sidewalls extends from a respective bead area to the tread. A carcass extends toroidally between each of the bead areas radially inwardly of the tread, and an innerliner is formed on an inside surface of the carcass. An RFID tag is attached to the tire at an area of a selected one of the sidewalls through interior sidewall attachment. A locator indicia is integrated into an axial outer surface of the selected sidewall at a locator area.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Inboard" refers to the axial inner surface of the tire as mounted on the vehicle.

"Innerliner" means the layer or layers of elastomer or other material that form the inside surface of a tubeless tire and that contain the inflating fluid within the tire.

"Interior sidewall attachment" means attachment of an RFID tag to the innerliner of the tire at the sidewall by using an adhesive or by curing the innerliner with the RFID tag in place at the sidewall, or disposing an RFID tag between layers of the tire structure at the sidewall.

"Outboard" refers to the axial outer surface of the tire as mounted on a vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

"RFID" means a radio frequency identification device, which is also referred to as an RFID tag.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
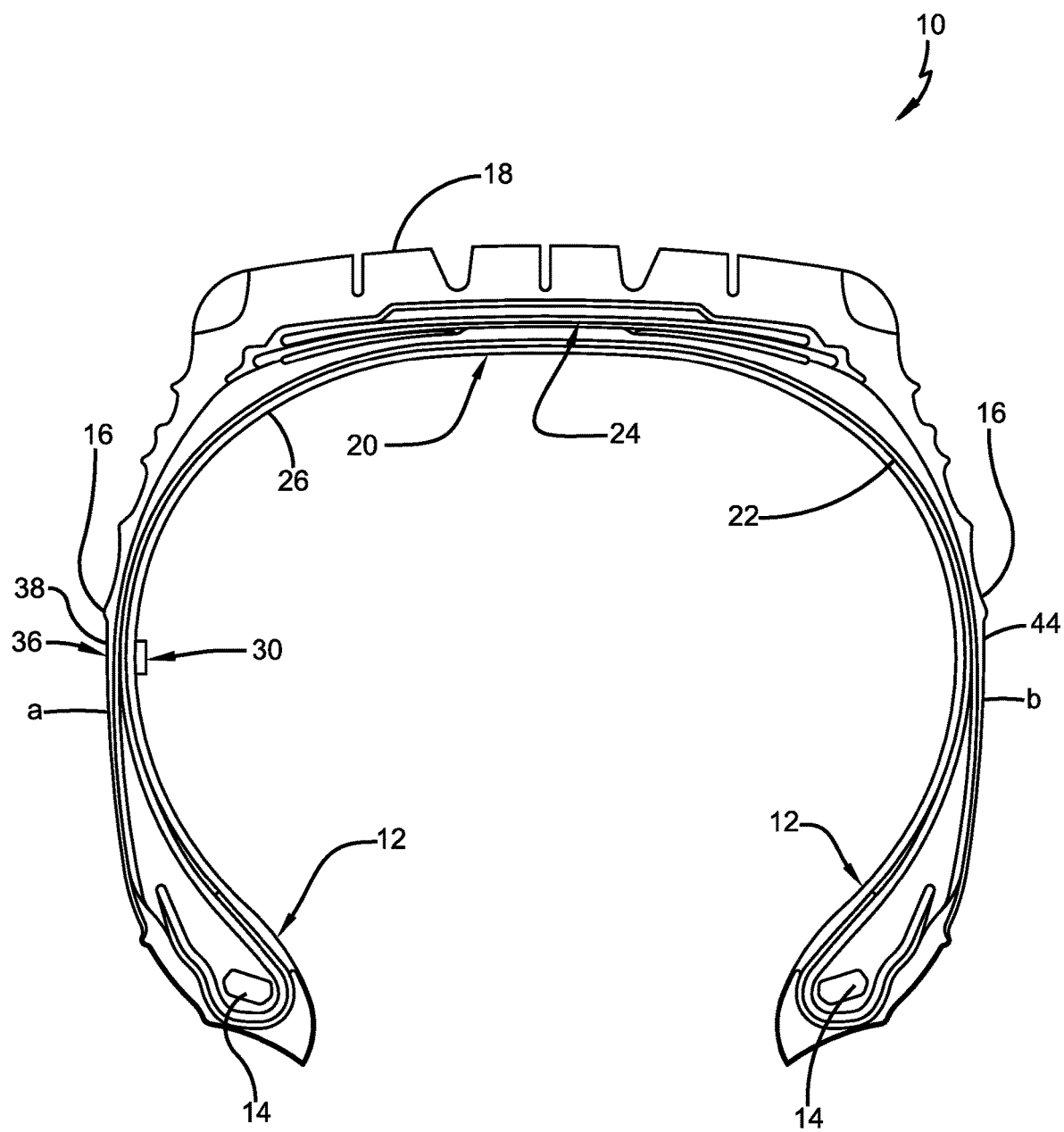
FIG. 1 is a cross-sectional view of an exemplary embodiment of a tire with an RFID locator of the present invention.
Figure 2:
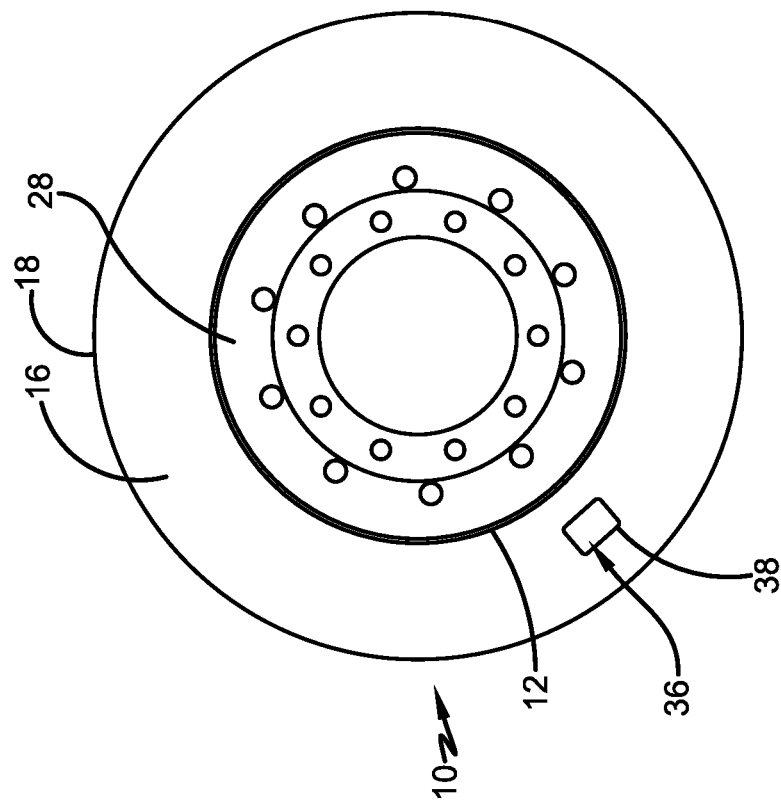
FIG. 2 is a schematic side view of the tire shown in FIG. 1.

An exemplary embodiment of a tire with an RFID locator of the present invention is indicated generally at 10 and is shown in FIG. 1. The tire 10 includes a pair of bead areas 12 and a respective bead core 14 embedded in each bead area. A respective sidewall 16 extends radially outward from each bead area 12 to a ground-contacting tread 18. The tire 10 is reinforced by a carcass 20 that toroidally extends from one of the bead areas 12 to the other one of the bead areas. The carcass 20 includes at least one ply 22 that preferably winds around each bead core 14. A belt reinforcement package 24 is disposed between the carcass 20 and the tread 18. An innerliner 26 is formed on the inside surface of the carcass. As shown in FIG. 2, the tire 10 is mounted on a wheel or rim 28, as known in the art.

Figure 3:
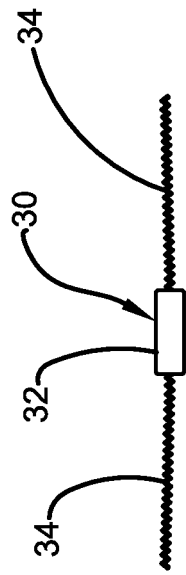
FIG. 3 is a schematic representation of an exemplary RFID tag incorporated into the tire shown in FIG. 1.

With reference now to FIGS. 1 and 3, an exemplary RFID tag is indicated at 30. The RFID tag 30 preferably includes a body 32 that is at least partially made of a polymer, and typically is semi-rigid in its construction. Housed within the body 32 of the RFID tag 30 is an integrated circuit and/or a printed circuit board for storing and processing tire identification information, and for modulating and demodulating a radio frequency signal. An antenna 34 for transmitting a signal to, and optionally for receiving a signal from, an external reader 52 (FIG. 6) is electronically connected to the integrated circuit and may extend outwardly from the body 32 in one or more directions. Alternatively, the antenna 34 may be integrated into the body 32 of the RFID tag 30.

Reference herein shall be made to the letter "a" to denote a first one of the sidewalls 16, and to the letter "b" to denote a second or opposing one of the sidewalls. The RFID tag 30 is attached to the tire innerliner 26 axially inwardly of a selected one of the sidewalls 16a using an adhesive or by curing the innerliner with the RFID tag in place at the sidewall. Alternatively, the RFID tag may be disposed between layers of the carcass 20 adjacent a selected one of the sidewalls 16a or between the carcass and the selected one of the sidewalls. Reference herein is made to sidewall 16a as the sidewall that is selected for interior sidewall attachment of the RFID tag 30, and sidewall 16b as the opposing sidewall, with the understanding that such reference is by way of example and either sidewall may be the selected sidewall.

Because only one RFID tag 30 is employed in the tire 10, and the tag is disposed at a selected one of the sidewalls 16a, it is desirable to visually communicate the RFID tag location to a technician and therefore enable optimum scanning of the RFID tag. Referring now to FIG. 2, a locator indicia 36 is integrated into the selected sidewall 16a at a locator area 38. More particularly, the locator area 38 is a designated area on the axial outer surface of the selected sidewall 16a that is disposed radially between the tread 18 and the bead area 12. The locator area 38 preferably is disposed in a circumferential location on the surface of the selected sidewall 16a that is in axial alignment with the RFID tag 30 to enable optimum scanning of the RFID tag signal. Alternatively, the locator area 38 may be disposed in a circumferential location on the surface of the selected sidewall 16a that is axially near enough to the RFID tag 30 to enable adequate scanning of the RFID tag signal, such as within about 90 circumferential degrees to about 180 circumferential degrees of the RFID tag.

Figure 4:
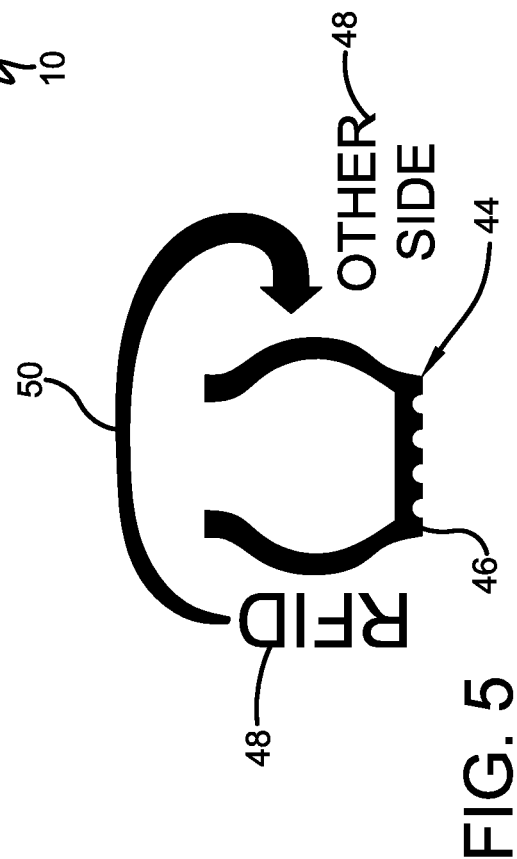
FIG. 4 is a schematic representation of an exemplary RFID locator indicia incorporated into the tire shown in FIG. 1.

The locator indicia 36 is formed on or integrated into the axial outer surface of the selected sidewall 16a at the locator area 38 by molding during the curing of the tire 10, or by post-cure techniques such as laser engraving, etching or an adhesive label. Turning now to FIG. 4, an example of the locator indicia 36 is shown. Preferably, the locator indicia 36 includes a clear visual design that communicates the presence of the RFID tag 30 (FIG. 1) to a technician. For example, the locator indicia 36 preferably includes lettering 40 such as "RFID" to denote the RFID tag 30. In addition, the locator indicia 36 may include a symbol 42 such as an acoustic wave representation to further denote the RFID tag 30. The features of the lettering 40 and symbol 42 enable the locator indicia 36 to clearly communicate the presence of the RFID tag 30 in the selected sidewall 16a (FIG. 1) and therefore enable optimum recognition and scanning of the RFID tag.

Figure 5:
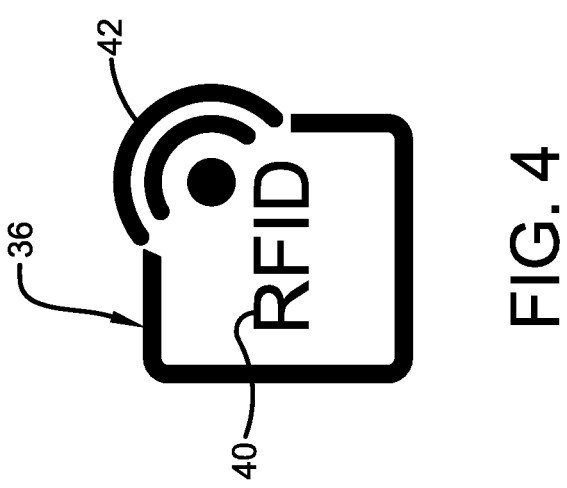
FIG. 5 is a schematic representation of an exemplary opposing RFID locator indicia incorporated into the tire shown in FIG. 1.

With reference now to FIGS. 1 and 5, an opposing indicia 44 may be integrated into the opposing sidewall 16b, which is the sidewall that does not bear the RFID tag 30. To enable optimum communication to a technician, the opposing indicia 44 is disposed radially between the tread 18 and the bead area 12 of the opposing sidewall 16b. The opposing indicia 44 may be disposed in any readily visible circumferential location on the axial outer surface of the opposing sidewall 16b to enable visual communication that the technician is viewing the sidewall which does not bear the RFID tag 30. The technician can thus realize that the signal from the RFID tag 30 may not be strong enough to adequately scan at the opposing sidewall 16b, and can adjust the tire 10 or move the reader 52 (FIG. 6) so that scanning is performed on the selected sidewall 16a (FIG. 2).

The opposing indicia 44 is formed on or integrated into the axial outer surface of the opposing sidewall 16b at the locator area 38 by molding during the curing of the tire 10, or by post-cure techniques such as laser engraving, etching or an adhesive label. An example of the opposing indicia 44 is shown by way of example in FIG. 5, and preferably includes a clear visual design which communicates to a technician viewing the opposing sidewall 16b that the RFID tag 30 (FIG. 1) is on the other sidewall 16a. For example, the opposing indicia 44 preferably includes a tire cross-sectional profile 46 and lettering 48 such as "RFID" and "OTHER SIDE" to denote the location of the RFID tag 30 on the other sidewall 16*a*. In addition, the opposing indicia 44 may include a symbol 50 such as an arrow pointing from the non-RFID, opposing sidewall 16*b*, to the selected sidewall 16*a*. The features of the tire profile 46, lettering 48 and symbol 50 enable the opposing indicia 44 to clearly communicate that the technician is viewing the opposing sidewall 16*b*, which does not bear the RFID tag 30, enabling the technician to adjust the tire 10 or move the reader 52 (FIG. 6) so that scanning is performed on the selected sidewall 16*a*.

Figure 6:
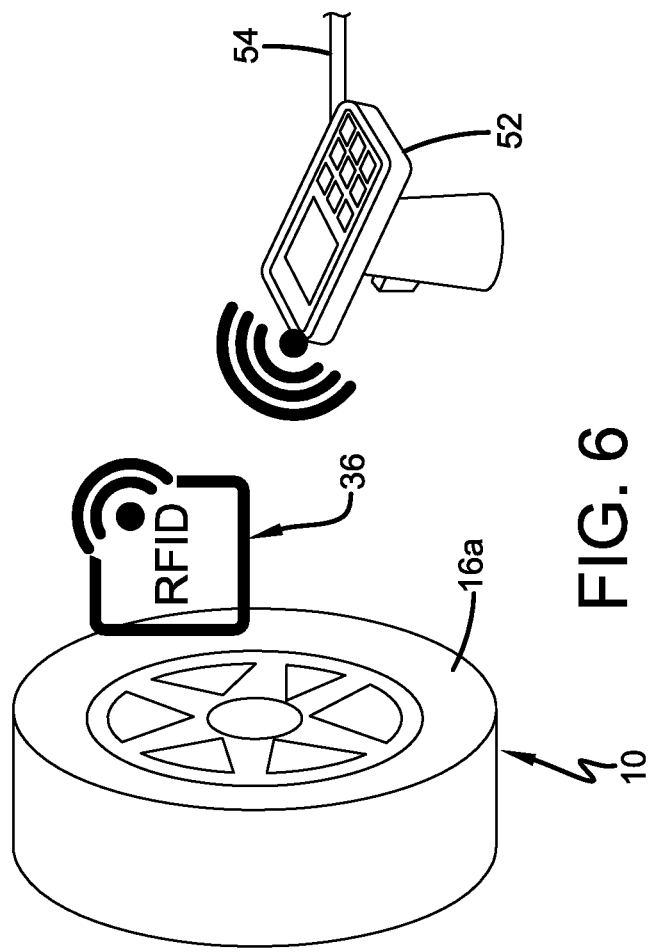
FIG. 6 is a schematic representation of the tire shown in FIG. 1 and a hand-held RFID scanner.

Turning now to FIG. 6, the locator indicia 36 enables the tire 10 to be oriented with the selected sidewall 16*a* and thus the RFID tag 30 (FIG. 1) are proximate an RFID reader 52, such as a hand-held scanner. When a hand-held reader or scanner 52 is employed, a technician may move the reader or scanner to the selected sidewall 16*a* after referencing the locator indicia 36 and/or the opposing indicia 44, or may change the orientation of the tire 10. If the reader 52 is not a hand-held unit, the locator indicia 36 and/or the opposing indicia 44 enable a technician to adjust the orientation of the tire 10 so that the selected sidewall 16*a* and the RFID tag 30 are proximate the reader. Once the selected sidewall 16*a* and the RFID tag 30 are proximate the reader 52, the reader wirelessly receives the radio frequency signal and thus the tire identification information data from the RFID tag. The data from the RFID tag 30 may then be stored in the reader 52 and/or transmitted through a wired or wireless connection 54 to a local and/or remote processor for storage and/or use in a system for managing or tracking the tire 10.

In this manner, the tire with an RFID locator 10 of the present invention, including the structural features described above, enables clear and easy communication to a technician of the location of an RFID tag 30 with interior sidewall attachment in the tire.

The present invention also includes a method of forming a tire with an RFID locator 10 bearing a locator indicia 36. The method includes steps in accordance with the description that is presented above and shown in FIGS. 1 through 6.

It is to be understood that the structure of the above-described tire 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire including an RFID locator, comprising:
   a pair of bead areas;
   a ground-contacting tread disposed radially outwardly of the pair of bead areas;
   a pair of sidewalls, in which each sidewall extends from a respective bead area to the tread;
   a carcass extending toroidally between each of the bead areas radially inwardly of the tread;
   an innerliner formed on an inside surface of the carcass;
   an RFID tag mounted inside the tire at a selected one of the sidewalls at a location not visible from the exterior of the tire; and
   a locator indicia integrated into an axial outer surface of the selected sidewall at a locator area, wherein the locator area is disposed on the axial outer surface of the selected sidewall radially between the tread and the respective bead and in a circumferential location on the surface of the selected sidewall in axial alignment with the RFID tag, whereby the locator indicia indicates the location of the RFID tag for scanning of the RFID tag by an external reader.

2. The tire including an RFID locator of claim 1, wherein the RFID tag is mounted to the tire innerliner axially inwardly of the selected one of the sidewalls using an adhesive.

3. The tire including an RFID locator of claim 1, wherein the RFID tag is mounted to the tire innerliner axially inwardly of the selected one of the sidewalls by curing the innerliner with the RFID tag in place.

4. The tire including an RFID locator of claim 1, wherein the RFID tag is mounted between layers of the carcass adjacent the selected one of the sidewalls.

5. The tire including an RFID locator of claim 1, wherein the RFID tag is mounted between the carcass and the selected one of the sidewalls.

6. The tire including an RFID locator of claim 1, wherein the locator indicia is formed on the axial outer surface of the selected sidewall by molding during the curing of the tire.

7. The tire including an RFID locator of claim 1, wherein the locator indicia is formed on the axial outer surface of the selected sidewall using a post-cure technique including at least one of laser engraving, etching and an adhesive label.

8. The tire including an RFID locator of claim 1, wherein the locator indicia includes at least one of lettering and a symbol.

9. The tire including an RFID locator of claim 8, wherein the lettering includes the letters RFID.

10. The tire including an RFID locator of claim 8, wherein the symbol includes an acoustic wave representation.

11. The tire including an RFID locator of claim 1, wherein a sidewall opposing the selected sidewall includes an opposing indicia.

12. The tire including an RFID locator of claim 11, wherein the opposing indicia is formed on an axially outer surface of the opposing sidewall and is disposed radially between the tread and the respective bead.

13. The tire including an RFID locator of claim 11, wherein the opposing indicia is formed on the axial outer surface of the opposing sidewall by molding during the curing of the tire.

14. The tire including an RFID locator of claim 11, wherein the opposing indicia is formed on the axial outer surface of the opposing sidewall using a post-cure technique including at least one of laser engraving, etching and an adhesive label.

15. The tire including an RFID locator of claim 11, wherein the opposing indicia includes at least one of a tire cross-sectional profile, lettering and a symbol.

16. The tire including an RFID locator of claim 15, wherein the lettering includes the letters RFID and OTHER SIDE.

17. The tire including an RFID locator of claim 15, wherein the symbol includes an arrow.

* * * * *